July 2, 1968 C. M. BROWN 3,390,968
HIGH DENSITY TUNGSTEN COMPACTS AND METHOD OF MAKING SAME
Filed Aug. 28, 1964
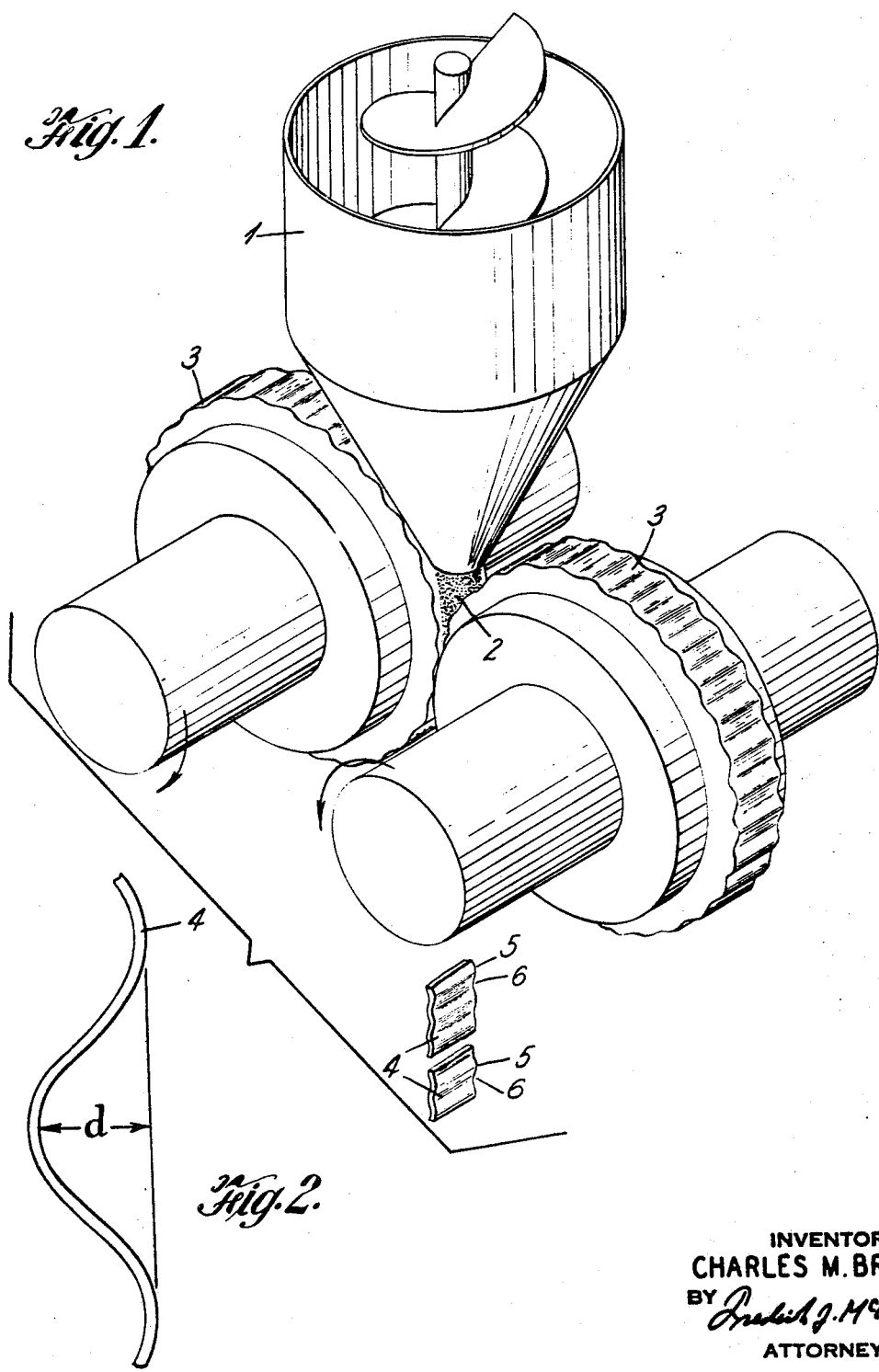
INVENTOR
CHARLES M. BROWN
BY *Frederick J. McCarthy*
ATTORNEY

United States Patent Office 3,390,968
Patented July 2, 1968

3,390,968
HIGH DENSITY TUNGSTEN COMPACTS AND METHOD OF MAKING SAME
Charles M. Brown, Lewiston, N.Y., assignor to Union Carbide Corporation, a corporation of New York
Filed Aug. 28, 1964, Ser. No. 392,728
2 Claims. (Cl. 29—183.5)

ABSTRACT OF THE DISCLOSURE

Production of strong, high density tungsten compacts by compacting finely divided tungsten powder between mating corrugated rolls.

---

The present invention relates to the compacting of tungsten powder. More particularly, the present invention relates to a novel high density tungsten compact and process for the making thereof.

Tungsten compacts are used in various melting operations, for example in the production of cast tungsten carbide, and strong high density tungsten compacts are particularly desirable to increase the weight of tungsten that can be handled in a given crucible volume and to avoid losses by dusting.

However, previously available tungsten compacts have had densities in the range of 140–160 g./in.$^3$ (45–50% of theoretical), and upon crushing, for the purpose of increasing bulk density, have yielded a large proportion of particles finer than 200 mesh. This rather low density and the tendency toward the formation of fines has imposed an economic penalty on the use of such material.

Various methods of densification, i.e. compacting, which have been previously tried include pressing into tablets, using commercial machines designed for this purpose. The density of the individual tablets obtained however is about 9 g./cc. (146 g./in.$^3$). Also, the bulk density of these tablets is low, about 85 g./in.$^3$, because of the inherent spacing between tablets in bulk form which prevents close packing. Moreover, when such tablets are crushed in an effort to obtain better bulk packing, relatively large amounts of undesirable fine dust is produced, e.g., 55% of the particles are finer than 200 mesh.

Other methods of pressing such as using male and female dies, or isostatic pressing also yield compacts which crumble readily on handling to produce large amounts of fines and the compacts have densities only slightly above 50% of theoretical.

Moreover, tests on the transverse strengths of the aforesaid type compacts have showed the modulus of rupture to be less than about 10,000 p.s.i.

It is therefore an object of the present invention to provide strong, high density tungsten compacts.

It is another object of the present invention to provide a process for producing strong high density tungsten compacts.

Other objects will be apparent from the following description and claims taken in conjunction with the drawing in which FIGURE 1 shows apparatus suitable for the practice of the present invention and FIGURE 2 shows a compact of the present invention.

A process in accordance with the present invention for producing strong, high density tungsten compacts broadly comprises introducing finely divided tungsten powder between mating corrugated rolls and compressing the powder between the rolls to provide corrugated strips of compacted tungsten.

In the practice of the present invention, with reference to FIGURE 1 of the drawing, tungsten powder, sized less than 50 microns, preferably from 1 to 20 microns, is fed from hopper 1 and is shown at 2 being introduced between essentially sinusoidal corrugated rolls 3, which are driven by a suitable conventional mechanism (not shown).

It the present invention it has been found to be essential that the sizing of the tungsten powder be less than 50 microns in order to provide high strength in the compact product as hereinafter indicated.

It is also essential that mating corrugated rolls be employed so as to provide a corrugated strip product having between about 8 and 16 ridges per foot, a thickness of from about 1/16 to 1/4 inch and a ridge depth of from 1/4 to 5/8 inch. The ridge depth is indicated as $d$ in FIGURE 2. A preferred compact of the present invention has a thickness of about 1/8 inch and is at least about 2 inches long. The corrugated product of the present invention is shown at 4 in the drawing. Ridges 5 of the corrugated product are shown separated by grooves 6.

With the use of corrugated rolls in accordance with the present invention an effective roll pressure of about 80,000 to 140,000 lb./in. is used and the product obtained has a density of at least 75% of theoretical density (14.5 g./cc.) and a transverse strength as indicated by modulus of rupture, of at least 15,000 p.s.i.

Moreover, the corrugated compacts of the present invention can be readily crushed to provide particles which are substantially all (more than about 80%) in the range of 8 to 200 mesh. That is to say, the compact product of the present invention can be crushed to practical sizes, and thus provide an increase in bulk density, substantially without the formation of undesirable fines.

The following Table I indicates comparatively the improved properties of the compacted product of the present invention.

TABLE I

| Compacting Procedure | Density of Compacts (g./cc.) | Percent of Particles Finer Than 200M After Crushing to MxD |
|---|---|---|
| Tablet Press, 3/8 in. x 1/2 in. dia. | 8.9–9.3 | 55 |
| Flat Roll Press, 1/8 in. thick compact | 11.9–12.2 | 17 |
| Corrugated Roll Press, 1/8 in. thick compact | 14.6–16.2 | 6 |

In preparing the materials described in the foregoing Table I about 10,000 p.s.i. pressure was used in tableting. About 40–60,000 lb./in. effective roll pressure was used in making the flat rolled compacts since it was found that higher pressures applied to the tungsten powder did not provide significantly higher densities.

The effective roll pressure used in making the corrugated product was about 80,000–140,000 lb./in. The corrugated roll faces apparently provide a degree of confinement for the feed power which enables the attainment of high densities and high strength.

The flat pressed compact material was produced in strip about 2 inches wide; the corrugated compact was about 1 inch wide and had about 1 1/3 ridges per inch of length. Most of the corrugated compacts were about 2 inches long. The tungsten powder used in making the compacts of Table I was the same type in all cases and was sized from about 1 to 30 microns with about 98% sized 1 to 20 microns.

As can be seen from the results of Table I, the present invention provides tungsten compacts which have exceptionally high density and which upon crushing, largely avoid the formation of fines.

A further advantage of the present invention is that the corrugated compacts can be sintered, to provide even further increase in density, e.g. of up to 85% of theoretical, and increased strength.

Suitable sintering conditions are 1400° C. to 1800° C. for about 30 minutes.

The mesh sizes referred to herein are Tyler Screen Series.

What is claimed is:
1. A process for producing tungsten compacts which comprises:
   (1) continuously introducing finely divided tungsten powder sized between about one and 50 microns between mating corrugated rolls; and
   (2) compressing the tungsten powder between the rolls at a roll pressure of 80,000 to 140,000 pounds per inch to provide a corrugated strip consisting of compacted tungsten between 1/16 and 1/4 inch thick, the corrugation of said rolls being such as to provide the corrugated strip with from 8 to 16 ridges per foot with the depth of the ridges being from 1/4 to 3/8 inch.

2. An article of manufacture, consisting of compacted tungsten powder in the form of corrugated strips at least about 2 inches long, 1/16 to 1/4 inch thick and having from 8 to 16 ridges per foot, the depth of the ridges being from 1/4 to 3/8 inch, said corrugated strips having a density of at least 14.5 grams/cc. and a modulus of rupture of at least 15,000 p.s.i.

References Cited
UNITED STATES PATENTS

| | | | |
|---|---|---|---|
| 1,315,859 | 9/1919 | Pfanstiehl | 29—192 |
| 2,341,732 | 2/1944 | Marvin | 29—191.2 |
| 2,811,750 | 11/1957 | Cofek | 29—191.2 |
| 2,979,400 | 4/1961 | Mouwen | 29—192 |

HYLAND BIZOT, *Primary Examiner.*

DAVID L. RECK, *Examiner.*

R. O. DEAN, *Assistant Examiner.*